United States Patent Office 3,775,441
Patented Nov. 27, 1973

3,775,441
DIURETHANES AND TRIURETHANES FOR CROSS-LINKING NATURAL AND SYNTHETIC RUBBER
Crispin Stuart Leworthy Baker, Stapleford, Douglas Barnard, Welwyn Garden City, and Maurice Read Porter, Aston, near Stevenage, England, assignors to The Natural Rubber Producers' Research Association, London, England
No Drawing. Continuation-in-part of application Ser. No. 862,507, Sept. 30, 1969, now Patent No. 3,645,980, dated Feb. 29, 1972. This application May 21, 1971, Ser. No. 145,882
Claims priority, application Great Britain, Oct. 4, 1968, 47,289/68
Int. Cl. C07c 125/06
U.S. Cl. 260—390   3 Claims

ABSTRACT OF THE DISCLOSURE

Paranitrosophenols, optionally carrying lower alkyl substituents, are reacted, in the oxime form, with organic di- or tri-isocyanates to give novel compounds having the general formula $$R(NH-CO-O-N=Q=O)_m$$

where $m$ is 2 or 3, Q is a para-quinonoid ring and R is for example an aliphatic hydrocarbon group. These products are employed as superior crosslinking agents for natural and synthetic rubbers.

---

This is a continuation-in-part of our co-pending application Ser. No. 862,507, filed Sept. 30, 1969, now U.S. Pat. 3,645,980, dated Feb. 29, 1972.

Our application No. 862,507 provides a system for crosslinking rubber which makes use of nitrosoanilines or nitrosophenols. The principle of the system is illustrated by the following schematic reaction diagram in which two rubber molecules, E, react with the nitroso groups of two nitrosophenol molecules, and the cross-link is completed by reaction of the pendent hydroxy groups with a di-isocyanate.

$$E + O=N-Ph-OH + OCN-(CH_2)_n-NCO + HO-Ph-N=O + E$$
$$\downarrow$$
$$E-NH-Ph-O-CO-NH-(CH_2)_n-NH-CO-O-Ph-NH-E$$

The system of this prior invention is particularly suitable for use with natural rubber. It is, however, also suitable for use with all natural and synthetic rubbers containing unsaturated carbon-carbon linkages, or other groups capable of reaction with aromatic nitroso groups, in appreciable amounts. The system is not suitable for use with those rubbers which contain very low amounts of unsaturation for vulcanization purposes, for example, ethylene-propylene terpolymers and butyl rubber.

Our prior application provides a method of cross-linking a natural or synthetic rubber, which method comprises reacting the rubber with an aromatic nitroso-compound having the formula X—Ar—NO, where X is a hydroxyl or a primary or secondary amino group and Ar is an aromatic group, and reacting pendent amino or hydroxyl groups in the resulting product with a di- or poly-isocyanate so as to cross-link the rubber.

The nitroso-compound for use in our prior application is one having a nitroso group, attached to a carbon atom of an aromatic ring, which is capable of adding to an unsaturated rubber molecule, and also having at least one hydroxyl or amine group capable of reacting with the linking compound. Thus, we may use ortho-, meta- or para-nitrosoaniline or ortho-, meta- or para-nitrosophenol. One hydrogen atom of the amine group may be replaced, provided that the reactivity of the amine group towards the linking compound is not thereby nullified. We may also use analogues of these compounds in which the aromatic ring carries one or more inert substiuents, such as alkyl or aryl groups, or forms part of a fused aromatic ring system, provided that such substituents are not so large and so positioned as to prevent the functional groups of the nitrosophenol or nitrosoaniline from reacting with the linking compound or with the rubber.

As a linking compound for our prior application, we may use an organic di- or poly-isocyanate. We prefer to use di-isocyanates, including aromatic compounds, for example, toluene-2,4-di-isocyanate, and aliphatic compounds, for example, that sold by E. I. du Pont de Nemours and Co. Inc. under the trademark Hylene W, believed to be 4,4'-di-isocyanato-dicyclohexylmethane. It is within the scope of the invention to use tri- or polyfunctional isocyanates as the linking compounds.

When the linking compound is a di- (or poly-) isocyanate, the rubber vulcanizates may be represented as having cross-links with the following general formula:

$$E-NH-Ar-Y-CO-NH-R$$
$$-NH-CO-Y-Ar-NH-E$$

where E represents a rubber molecule, Ar is an aromatic group, Y is an oxygen atom or a substituted or unsubstituted —NH— group, and R is a di- (or poly-) functional organic group.

One advantage of the system of our prior invention lies in the fact that the properties of the vulcanizate may be readily altered by altering the length of the cross-linking chain. Long cross-linking chains can readily be achieved by using higher molecular weight linking compounds, for example, those di-isocyanates sold by E. I. du Pont de Nemours and Co. Inc. under the trademark Adiprene.

According to our prior application, the nitroso compound, or the linking compound, or both, may be formed in situ in the rubber mix, rather than being added per se.

According to a particularly preferred aspect of our prior application, the pre-reaction product of a nitrosophenol with a di- or poly-isocyanate is added to the rubber, and the resulting mix heated to cross-link the rubber. The pre-reaction product is formed by a reaction between a di-isocyanate and a nitrosophenol in its oxime form. The diurethane thus formed is believed to be decomposed subsequently at an elevated temperature to give the nitrosphenol and the di-isocyanate which then vulcanize the rubber. We have found that 140° C. to 180° C. dependent on structure, is normally sufficient to decompose the diurethane, and that cure may be conveniently effected by heating the mix for 30 minutes at a temperature in this range.

The present invention relates to the urethanes which are described in our prior application for cross-linking natural or synthetic rubbers. The compounds are not true urethanes, being the reaction products of isocyanate with —NOH, rather than —COH. Their full chemical names are, however, complex, and they are referred to, for convenience, in this specification as urethanes.

The present invention provides a compound having the general formula:

$$R(NH-CO\cdot O\cdot N=Q=O)_m$$

where $m$ is 2 or 3,
R is a difunctional or trifunctional organic group, and
Q is a para-quinonoid ring which may carry one or more lower alkyl substituents.

These compounds may be prepared by reacting a di- or tri-isocyanate having the formula $R(NCO)_m$, where R and $m$ are as defined above, with a para-nitrosophenol having the formula HO—Ar—N=O, where Ar is a benzene ring which may carry one or more lower alkyl substituents. The reaction may be represented thus:

$$HO-Ar-N=O \rightleftharpoons O=Q=N-OH$$
nitrosophenol      oxime form $$HO-Ar-N=O \rightleftharpoons O=Q=N-OH$$
nitrosophenol      oxime form (Q is the quinonoid configuration of Ar)

$$mO=Q=N-OH + R(NCO)_m \rightarrow R(NH-CO \cdot O \cdot N=Q=O)_m$$

This reaction is easily effected, and the reaction conditions are not critical. It may be possible to perform the reaction simply by mixing the two reactants. It is generally more convenient to use an inert organic liquid medium, for example an aliphatic or aromatic hydrocarbon. In some instances, the isocyanate is readily soluble in the liquid medium and the nitrosphenol only sparingly soluble; reaction takes place as the nitrosophenol slowly dissolves, and the extremely insoluble urethane reaction product may subsequently be readily separated from the liquid medium.

Reaction between nitrosophenols and isocyanates may take place at ambient temperatures, particularly in the case of the more reactive aromatic isocyanates. However, it is generally preferable to warm the reaction mixture, and temperatures up to about 130° C. may be used. A tertiary-amine catalyst, for example, triethylenediamine may be employed, if desired, to speed up the reaction.

We prefer to use $m$ moles of nitrosophenol per mole of the isocyanate (where $m$ is the functionality of the isocyanate). However, the relative proportions of the reactants are not critical provided the amount of nitrosophenol is at least equivalent to the amount of isocyanate.

As can be seen from the above description, the group R plays no part in the preparative reaction, and its nature is not critical to the present invention. We believe that any organic di- or tri-isocyanate will react with nitrosophenols in the manner indicated above to give products according to this invention. The commercially available di- and tri-isocyanates indicate that R is most likely to be a di- or poly-functional hydrocarbon grouping or a polyether or polyether-glycol grouping, e.g. either an aromatic hydrocarbon group or a saturated aliphthaic hydrocarbon group. Illustrative examples of isocyanates are the following:

toluene-2,4 di-isocyanate
dicyclohexylmethane-4,4'-di-isocyanate
2,2,4-trimethylhexamethylene-1,6-di-isocyanate
hexamethylene-1,6-di-isocyanate
diphenylmethane-4,4'-di-isocyanate
triphenylmethane-4,4'-4''-tri-isocyanate
3-isocyanatomethyl-3,5,5-trimethylcyclohexylisocyanate
isocyanate terminated polytetramethylene ether glycol di-isocyanate adducts
isocyanate terminated polyethylene adipate glycol di-isocyanate adducts
isocyanate terminated polypropylene ether glycol di-isocyanate adducts
isocyanate terminated polyethylene propylene adipate glycol di-isocyanate adducts.

Any para-nitrosophenol, whether unsubstituted or carrying one or more lower alkyl nuclear substituents, may be used in the preparation of the compounds of this invention. It is believed that all such nitrosophenols are in equilibrium with their oxime forms. The following are illustrative examples of suitable nitrosophenols:

4-nitrosophenol
2-methyl-4-nitrosophenol
3-methyl-4-nitrosophenol
2,6-dimethyl-4-nitrosophenol
3,5-dimethyl-4-nitrosophenol
2,6-di-isopropyl-4-nitrosophenol
3-isopropyl-4-nitrosophenol
2-tert-butyl-4-nitrosophenol
2-isopropyl-5-methyl-4-nitrosophenol
2-methyl-5-isopropyl-4-nitrosophenol The urethane compounds of this invention generally melt with decomposition to give the constituent free nitrosophenol and isocyanate. It is this property which makes the urethane compounds so valuable as curing agents for natural rubber and synthetic rubbers having unsaturated carbon chains.

The following examples illustrate the invention.

EXAMPLE 1

Diurethane from p-nitrosophenol and 1,6-diisocyanatohexane 1,6-diisocyanatohexane (4.2 g.), p-nitrosophenol (6.15 g.) and dry toluene (75 ml.) were heated to 100° C. for 20 min. during which time the product precipitated out. After cooling, the yellow solid was filtered off, washed with toluene and pumped free of solvent to give the diurethane 7.8 g. (75%).

M.P. 151–152° C. (decom.).

Analysis.—$C_{20}H_{22}N_4O_6$ requires (percent): C, 58.0; H, 5.4; N, 13.5. Found (percent): C, 58.5; H, 5.4; N, 13.2.

EXAMPLE 2

Diurethane from p-nitrosophenol and 1,6-diisocyanato-2,2,4-trimethylhexane 1,6 - diisocyanato - 2,2,4 - trimethylhexane (5.25 g.), p-nitrosophenol (6.15 g.) and dry toluene (75 ml.) were heated to 100° C. for 1 hour. After cooling a dark oil separated out. The toluene was decanted off and the oil washed 4 times with toluene. During the final wash the oil crystallized on scratching with a glass rod to give a light brown solid. This was filtered off and pumped free of solvent to give the diurethane 4.7 g. (41%).

M.P. 132–134° C. (decomp.).

Analysis.—$C_{23}H_{28}N_4O_6$ requires (percent): C, 60.4; H, 6.2; N, 12.3. Found (percent): C, 60.4; H, 6.3; N, 12.4.

EXAMPLE 3

Diurethane from p-nitrosophenol and 3-isocyanatomethyl-3,5,5-trimethylcyclohexylisocyanate 3 - isocyanatomethyl - 3,5,5 - trimethylcyclohexylisocyanate (40.3 g.), p-nitrosophenol (44.7 g.), triethylenediamine (1.6 g., catalyst 4 mole percent with respect to p-nitrosophenol) and dry toluene (1100 ml.) were stirred for 16 hours at room temperature, and the reaction mixture poured into petroleum spirit (B.P. 60/80° C.) (3 l.) to precipitate the product. The yellow precipitate was filtered off, washed with further petroleum spirit and pumped free of solvent to give the diurethane 40.6 g. (47%).

M.P. 87.5–89.5° C. (decomp.).

Analysis.—$C_{24}H_{28}N_4O_6$ requires (percent): C, 61.6; H, 6.0; N, 12.0. Found (percent): C, 59.5; H, 6.1; N, 11.6.

EXAMPLE 4

Diurethane from p-nitrosophenol and 4,4'-diisocyanatodicyclohexylmethane (Hylene W)

4,4' - diisocyanatodicyclohexylmethane (26.4 g.), p-nitrosophenol (24.6 g.) and dry toluene (300 ml.) were heated to 100° C. for 20 min. After cooling, the yellow product that had precipitated out was filtered off, washed with toluene and pumped free of solvent to give the diurethane 44.3 g. (87%) M.P. 136.5–138° C. (decomp.).

Analysis.—$C_{27}H_{32}N_4O_6$ requires (percent): C, 63.8; H, 6.3; N, 11.0. Found (percent): C, 63.8; H, 6.3; N, 10.7.

This reaction was also carried out in the presence of triethylenediamine (catalyst 1 mole percent with respect to p-nitrosophenol) when it was only necessary to heat to 70–80° C.

A similar reaction was carried out with Nacconate H–12 (trademark of Allied Chemical Corporation) in place of Hylene W. Both are 4,4'-diisocyanatodicyclohexylmethane but they have different cis, trans isomer ratios.

M.P. 138–140° C.

EXAMPLE 5

Diurethane from p-nitrosophenol and toluene-2,4-diisocyanate

Toluene-2,4-diisocyanate (5.2 g.), p-nitrosophenol (7.4 g.) and dry toluene (60 ml.) were heated to 100° C. for 15 minutes during which time the product precipitated out. After cooling, the yellow solid was filtered off, washed with toluene and pumped free of solvent to give the diurethane 11.6 g. (92%).

M.P. 176–178° C.

Analysis.—$C_{21}H_{16}N_4O_6$ requires (percent): C, 60.0; H, 3.8; N, 13.3. Found (percent): C, 59.8; H, 4.1; N, 13.3.

EXAMPLE 6

Diurethane from p-nitrosophenol and 4,4'-diisocyanatodiphenylmethane 4,4'-diisocyanatodiphenylmethane (6.25 g.), p-nitrosophenol (6.15 g.) and dry toluene (75 ml.) were heated to 80° C. to give a thick precipitate which necessitated the addition of further toluene (75 ml.) to render the reaction mixture mobile. After heating for a further 0.5 hour at 100° C. the mixture was allowed to cool. The product was filtered off, washed with toluene and pumped free of solvent to give the diurethane 12.0 g. (97%).

M.P. 188–190° C. (decomp.).

Analysis.—$C_{27}H_{20}N_4O_6$ requires (percent: C, 65.3; H, 4.1; N, 11.3. Found (percent): C, 66.5; H, 4.0; N, 11.4.

This reaction was also carried out in the presence of triethylenediamine (4 mole percent with respect to p-nitrosophenol) when it was only necessary to react at room temperature for 1.5 hours.

EXAMPLE 7

Triurethane from p-nitrosophenol and 4,4',4''-triisocyanatotriphenylmethane 4,4'4''-triisocyanatotriphenylmethane (3.67 g.), p-nitrosophenol (3.69 g.), triethylenediamine (0.1 g., catalyst 3 mole percent with respect to p-nitrosophenol) and dry toluene (45 ml.) were stirred for 1.5 hours at room temperature during which time the product precipitated out. To ensure complete reaction the mixture was heated to 60° C. for 0.5 hour. The yellow solid was filtered off, washed with petroleum spirit (B.P. 40/60° C.) and pumped free of solvent to give the crude triurethane 3.7 g. (50%).

M.P. 130–147° C. (decomp.).

EXAMPLE 8

Diurethane from p-nitrosothymol (2-isopropyl-5-methyl-4-nitrosophenol) and toluene-4-diisocyanate Toluene-2,4-diisocyanate (4.35 g.), p-nitrosothymol (8.95 g.), triethylenediamine (0.22 g., catalyst 4 mole percent with respect to p-nitrosothymol) and dry toluene (150 ml.) were stirred at room temperature for 0.75 hour during which time the product precipitated out. The yellow solid was filtered off, washed with petroleum spirit (B.P. 60/80° C.) and pumped free of solvent to give the diurethane 8.4 g. (63%).

M.P. 154–157.5° C. (decomp.).

Analysis.—$C_{29}H_{32}N_4O_6$ requires (percent): C, 65.4; H, 6.0; N, 10.5. Found (percent): C, 64.7; H, 6.0; N, 10.3.

EXAMPLE 9

Diurethane from p-nitrosothymol and 4,4'-diisocyanatodiphenylmethane 4,4'-diisocyanatodiphenylmethane (3.75 g.), p-nitrosothymol (5.45 g.), triethylenediamine (0.13 g., catalyst 4 mole percent with respect to p-nitrosothymol) and toluene (45 ml.) were stirred at room temperature for 2 hours during which time the product precipitated out. The light yellow solid was filtered off, washed with toluene and pumped free of solvent to give the diurethane 6.85 g. ((74%).

M.P. 157–159° C. (decomp.).

EXAMPLE 10

Diurethane from p-nitroso-m-cresol (3-methyl-4-nitrosophenol) and toluene-2,4-diisocyanate Toluene-2,4-diisocyanate (4.35 g.), p-nitroso-m-cresol (6.85 g.), triethylenediamine (0.22 g., catalyst 4 mole percent with respect to p-nitroso-m-cresol) and dry toluene (75 ml.) were stirred at room temperature for 1 hour during which time the product precipitated out. The yellow solid was filtered off, washed with toluene and pumped free of solvent to give the diurethane 9.1 g. (81%).

M.P. 186–187° C. (decomp.).

The following compounds were prepared by generally similar methods to those illustrated in Examples 1 to 10 above.

TABLE 1

| Example | Nitrosophenol | Isocyanate | M.P (° C.) |
|---|---|---|---|
| 11 | 2-methyl-4-nitrosophenol | Toluene-2,4-diisocyanate | 181 |
| 12 | 2,6-dimethyl-4-nitrosophenol | do | 126 |
| 13 | 3,5-dimethyl-4-nitrosophenol | do | 187 |
| 14 | 2,6-di-isopropyl-4-nitrosophenol | do | 158 |
| 15 | 3-isopropyl-4-nitrosophenol | do | 177 |
| 16 | do | 4,4'-diisocyanatodiphenylmethane | 147 |
| 17 | 2-tert-butyl-4-nitrosophenyl | Toluene-2,4-diisocyanate | 167 |
| 18 | 2-methyl-5-isopropyl-4-nitrosophenol | do | 150 |

The experimental data which follow illustrate the utility of the claimed compounds as vulcanizing agents. The following abbreviations are used.

phr.=Parts per hundred by weight of dry rubber.
RSS1=Ribbed smoked sheets Grade 1.
SRF black=Semi-reinforcing furnace black.
Caloxol C31=Calcium oxide suspension in oil (trademark).
Hylene W=An aliphatic di-isocyanate of NCO content 31.8% by weight (trademark).
TDI=Toluene-2,4-di-isocyanate.
TMDI=2,2,4 - trimethyl - hexamethylene - 1,6 - di-isocyanate.
MR 100=Relaxed modulus at 100% extension (BS1673, pt. 4, section 4.62 (1953)).
ZDMC=Zinc dimethyldithiocarbamate.

EXAMPLES 19 TO 26

Samples of various diurethane compounds were added with Caloxol C31 to RSS1 in the normal manner on a cold, open mill. In Examples 21 to 26, additional isocyanate was included (not necessarily, it should be noted, the di-isocyanate from which the diurethane had been prepared). In Examples 22, 24 and 26, ZDMC was also added. The mixes were press-cured under appropriate conditions, and the MR 100 values of the vulcanizates are given in Table 2.

TABLE 2

| | Example No. | | | | | | | |
|---|---|---|---|---|---|---|---|---|
| | 19 | 20 | 21 | 22 | 23 | 24 | 25 | 26 |
| Composition (phr.): | | | | | | | | |
| RSS1 | 100 | 100 | 100 | 100 | 100 | 100 | 100 | 100 |
| Caloxol | 5 | 5 | 5 | 5 | 5 | 5 | 5 | 5 |
| Diurethane 1 | 0 | 0 | 3.25 | 3.25 | 0 | 0 | 0 | 0 |
| Diurethane 2 | 0 | 0 | 0 | 0 | 3.6 | 3.6 | 0 | 0 |
| Diurethane 5 | 4 | 10 | 0 | 0 | 0 | 0 | 3.35 | 3.35 |
| Hylene W | 0 | 0 | 3 | 3 | 0 | 0 | 0 | 0 |
| TMDI | 0 | 0 | 0 | 0 | 2.4 | 2.4 | 0 | 0 |
| TDI | 0 | 0 | 0 | 0 | 0 | 0 | 2.0 | 2.0 |
| ZDMC | 0 | 0 | 0 | 2 | 0 | 2 | 0 | 2 |
| Cure time (mins.) | 30 | 30 | 30 | 30 | 30 | 30 | 30 | 30 |
| Temperature (° C.) | 180 | 180 | 150 | 150 | 150 | 150 | 150 | 150 |
| MR 100 (kg./cm.²) | 3.4 | 4.7 | 3.4 | 4.9 | 3.2 | 3.8 | 3.4 | 5.2 |

EXAMPLES 27 TO 34

Natural rubber gum vulcanizate formulations were prepared by mixing together 100 parts of RSS1, 5 phr. of Caloxol C31 and various proportions of Diurethane 4. Hylene W and ZDMC in the normal manner at about 70° C. on an open mill. The mixes were cured under appropriate conditions (30 minutes at 140° C. for Examples 27 and 28, and 60 minutes at 140° C. for Examples 29 to 34). The relaxed modulus at 100% extension of the vulcanizates is reported in Table 3.

TABLE 3

| | Example No. | | | | | | | |
|---|---|---|---|---|---|---|---|---|
| | 27 | 28 | 29 | 30 | 31 | 32 | 33 | 34 |
| Composition (phr.): | | | | | | | | |
| RSS1 | 100 | 100 | 100 | 100 | 100 | 100 | 100 | 100 |
| Caloxol C31 | 5 | 5 | 5 | 5 | 5 | 5 | 5 | 5 |
| Diurethane 4 | 10 | 10 | 10 | 10 | 8 | 6 | 4 | 2 |
| ZDMC | 0 | 0 | 2 | 2 | 4 | 2 | 2 | 2 |
| Hylene W | 0 | 5 | 0 | 3 | 1 | 2 | 5 | 3 |
| MR 100 (kg./cm.²) | 3.9 | 10.7 | 7.9 | 12.2 | 9.1 | 8.3 | 9.0 | 6.5 |

EXAMPLES 35 TO 39

Further samples of Diurethane 4 were used to prepare natural rubber filled vulcanizate compositions. The Diurethane 4 was mixed in the usual way with RSS1, SRF black, Caloxol C31, and in certain cases with Hylene W, ZDMC and a compounding oil (Petrofina 2069) at about 70° C. on an open mill. The mixes were cured under appropriate conditions (30 minutes at 140° C. for Examples 35 and 36, and 60 minutes at 140° C. for Examples 37 to 39). The relaxed modulus at 100% extension of the vulcanizates is reported in Table 4.

TABLE 4

| | Example No. | | | | |
|---|---|---|---|---|---|
| | 35 | 36 | 37 | 38 | 39 |
| Composition (phr.): | | | | | |
| RSS1 | 100 | 100 | 100 | 100 | 100 |
| SRF black | 50 | 50 | 50 | 50 | 50 |
| Caloxol C31 | 5 | 5 | 5 | 5 | 5 |
| Diurethane 4 | 10 | 10 | 8 | 6 | 4 |
| ZDMC | 0 | 0 | 2 | 2 | 2 |
| Hylene W | 0 | 4 | 1 | 2 | 3 |
| Oil (Petrofina 2069) | 5 | 5 | 0 | 0 | 0 |
| MR 100 (kg./cm.²) | 9.9 | 23.3 | 20.3 | 21.6 | 20.8 |

We claim:
1. A compound of the formula

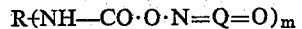

where
m is 2 or 3,
R is an aromatic or saturated aliphatic di- or trivalent hydrocarbon group, and
Q is a para-benzoquinonoid or lower alkyl substituted para-benzoquinonoid ring.

2. A compound as claimed in claim 1, wherein R is selected from the group consisting of:
toluene-2,4-
dicyclohexylmethane-4,4'-
2,2,4-trimethylhexamethylene-1,6-
hexamethylene-1,6-
diphenylmethane-4,4'-
triphenylmethane-4,4',4''-
and the difunctional group obtained by removing the two isocyanate groups from 3-isocyanatomethyl-3,5,5-trimethylcyclohexylisocyanate.

3. A compound as claimed in claim 1, wherein the benzoquinonoid ring Q is unsubstituted or carries a lower alkyl substituent selected from the group consisting of:
2-methyl-,
3-methyl-,
2,6-dimethyl-,
3,5-dimethyl-,
2,6-diisopropyl-,
3-isopropyl-,
2-tert-butyl-,
2-isopropyl-5-methyl-, and
2-methyl-5-isopropyl,
the ring carbon atom attached to oxygen being numbered 1- in each case.

References Cited
UNITED STATES PATENTS
3,352,750  11/1967  Buntin _____ 260—396 N VIVIAN GARNER, Primary Examiner U.S. Cl. X.R.
260—77.5 CR, 85.1, 396 N, 768